United States Patent
Schreurs

(10) Patent No.: US 7,617,812 B2
(45) Date of Patent: Nov. 17, 2009

(54) METHOD OF OPERATING A COMPRESSION IGNITION ENGINE

(75) Inventor: Bart Hubert Schreurs, Waltzing (BE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/156,788

(22) Filed: Jun. 4, 2008

(65) Prior Publication Data

US 2008/0306675 A1   Dec. 11, 2008

(30) Foreign Application Priority Data

Jun. 5, 2007   (EP)   ................... 07252263
Mar. 27, 2008   (EP)   ................... 08153393

(51) Int. Cl.
F02B 17/00   (2006.01)
B60T 7/12   (2006.01)

(52) U.S. Cl. ...................... 123/295; 701/104

(58) Field of Classification Search ............... 123/295, 123/305, 478, 492, 493; 701/103, 104, 110, 701/115

See application file for complete search history.

(56) References Cited

U.S. PATENT DOCUMENTS

| | | | |
|---|---|---|---|
| 6,178,943 B1 * | 1/2001 | Taga et al. | ................... 123/295 |
| 6,308,671 B1 * | 10/2001 | Reed et al. | ................ 123/90.15 |
| 6,510,835 B1 * | 1/2003 | Mizuno et al. | ............... 123/295 |
| 6,581,572 B1 * | 6/2003 | Hurley et al. | ................ 123/478 |
| 2006/0048744 A1 * | 3/2006 | Castagne et al. | ............. 123/305 |

FOREIGN PATENT DOCUMENTS

| | | |
|---|---|---|
| DE | 102 08 426 | 9/2002 |
| EP | 1 632 668 | 3/2006 |

OTHER PUBLICATIONS

EP Search Report dated Nov. 9, 2007.

* cited by examiner

*Primary Examiner*—Thomas N Moulis
(74) *Attorney, Agent, or Firm*—Paul L. Marshall

(57) ABSTRACT

It relates to a method of operating a compression ignition engine comprising:—
  determining an instantaneous driver torque demand;
  selectively operating the engine in a first mode or a second mode dependent on the rate of change of driver torque demand;
  said first mode comprising an air lead mode whereby the intake air flow rate is controlled to achieve the instantaneous driver torque demand and an amount of fuel injected is controlled to obtain a target air/fuel ratio based upon said intake air flow rate;
  said second mode comprising a fuel lead mode wherein the amount of fuel injected is controlled to achieve the instantaneous torque demand.

10 Claims, 1 Drawing Sheet

METHOD OF OPERATING A COMPRESSION IGNITION ENGINE

TECHNICAL FIELD

Due to chemical reactions and the incomplete combustion of fuel in the combustion chamber of an internal combustion engine, the gases emitted from the exhaust system of the engine may contain a number of hazardous substances which can lead to air pollution problems that may be detrimental to health and the environment.

BACKGROUND OF THE INVENTION

An ever increasing number of vehicles has resulted in increasing air pollution, particularly in urban areas. Therefore, a series of ever stricter emission standards have been imposed to mitigate these pollution problems.

The main pollutants of concern are hydrocarbons (HC), carbon monoxide (CO), oxides of nitrogen ($NO_x$) and particulates (i.e. soot).

Gasoline fuelled spark ignition (SI) engines typically operate under an air lead mode, wherein a throttle valve controls the rate of air supplied to the engine in response to the torque requests of the driver and the fuel supply system supplies an amount of fuel based upon the air supply rate to obtain a desired air/fuel ratio.

In order to reduce the emissions of HC, CO and $NO_x$ from gasoline fuelled spark ignition (SI) engined vehicles, three way catalytic converters have been widely implemented, such three way catalytic devices incorporating a reduction catalyst, to reduce $NO_x$ to $N_2$ and $O_2$, and an oxidation catalyst, to oxidise CO to $CO_2$ and HC to H2O and $CO_2$. However, for correct operation of a three way catalyst, the vehicle engine must be controlled to operate stoichiometrically where the amount of oxygen supplied to the combustion chamber corresponds to that required for complete combustion of the amount of fuel supplied. For gasoline, this corresponds to an air/fuel ratio of 14.7 parts air to 1 part fuel.

When there is more air, and hence oxygen, than required, then the system is said to be running lean, and the system is in oxidizing condition. In that case, the converter's two oxidizing reactions (oxidation of CO and HC) are favoured, at the expense of the reducing reaction. When there is excessive fuel, then the engine is running rich. The reduction of $NO_x$ is favoured, at the expense of CO and HC oxidation. If an engine could be held at the strict stoichiometric point for the fuel used, it is theoretically possible to reach 100% conversion efficiencies.

Unlike spark ignition gasoline fuelled engines, diesel fuelled compression ignition engines are normally operated under an fuel lead mode wherein a fuel is injected into the combustion chambers (or into a pre combustion chamber) at a rate based upon the torque demand of the driver, and air is drawn into the engine to supply oxygen for the combustion of such fuel by the pumping action of the engine and possibly also by the boosting effort of a turbocharger/compressor. An advantage of this form of combustion is the low pumping losses, particularly at part load, because of the absence of a throttle valve in the intake. However, such fuel lead operation results in a great variation of the air/fuel ration of the combustion mixture during engine operation.

As discussed above, in a compression ignition engine, torque demands are met by varying the amount of fuel supplied to the engine and there is normally no precise control of the amount of air supplied (no throttling in the intake) and thus, while an oxidation catalyst can be used to oxidise CO to $CO_2$ and HC to $H_2O$ and $CO_2$, excess oxygen in the exhaust gases due to the lean burn conditions normally prevents reduction of $NO_x$ to $N_2$ and $O_2$ and thus prevents the use of a three way catalyst.

The big challenge for future diesel emissions is the more tightly control the air/fuel ratio to control the composition of the exhaust gases and to enable correct operation of various exhaust gas treatment devices located within the exhaust system.

For example, it is known to use after-treatment of the exhaust gases to remove the $NO_x$.

Selective catalytic reduction (SCR) can be used to reduce the $NO_x$ wherein a gaseous or liquid reductant (most commonly ammonia or urea) is added to the exhaust gas stream and is absorbed onto a catalyst. The reductant reacts with $NO_x$ in the exhaust gas to form $H_2O$ (water vapour) and $N_2$ (nitrogen gas). However, SCR is very sensitive to fuel contaminants, requires a limited (high) temperature operation window and is costly.

Another method of exhaust after-treatment to remove the $NO_x$ is the use of a lean $NO_x$ trap. This requires rich regeneration phases (increased fuel consumption), has a limited temperature operation window and is again costly and prone to failure due to fuel contamination, in particular sulphur.

Even where EGR or throttling is used to control the intake air flow rate supplied to the engine to control the air/fuel ratio, the slow response time of the air flow compared to the rapid response time of the fuel supply leads to large variation in the air/fuel ratio. For example, every time there is a sudden change in torque request, there is a sudden change is the amount of fuel supplied to the combustion chamber, resulting in a sudden change in the air/fuel ratio. Every time the driver asks for less torque, the sudden reduction in the fuel supply will result in an immediate increase in lambda (i.e. a change to a lean mixture).

The present invention aims to provide an improved method of operating a compression ignition engine where greater control of the air/fuel ratio is achieved without compromising driveability or engine responsiveness.

SUMMARY OF THE INVENTION

According to the present invention there is provided a method of operating a compression ignition engine comprising:— determining an instantaneous driver torque demand;

selectively operating the engine in a first mode or a second mode dependent on the rate of change of driver torque demand;

said first mode comprising an air lead mode whereby the intake air flow rate is controlled to achieve the instantaneous driver torque demand and an amount of fuel injected is controlled to obtain a target air/fuel ratio based upon said intake air flow rate;

said second mode comprising a fuel lead mode wherein the amount of fuel injected is controlled to achieve the instantaneous torque demand.

Preferably the engine is operated in the first mode under substantially steady state conditions and in the second mode under conditions of rapid change of torque demand.

In a preferred embodiment, the method comprises:— determining an instantaneous driver torque demand;

determining an actual intake air flow rate;

determining a required intake air flow rate to achieve the torque demand at a target air/fuel ratio;— determining an amount of fuel to be injected to achieve said target air/fuel ratio based upon the required air intake flow rate;

determining an air/fuel ratio that would be achieved by injecting said determined amount of fuel into the actual intake air flow rate;

where the determined air/fuel ratio falls within a predetermined range of the target air/fuel ratio, controlling the intake air flow rate to achieve said determined intake air flow rate and controlling the amount of fuel injected to achieve said target air/fuel ratio;

where the determined air/fuel ratio falls outside of a predetermined range of the target air/fuel ratio, controlling the amount of fuel to be injected to achieve said torque demand irrespective of the target air/fuel ratio.

By operating the engine in an air lead mode, where such mode does not adversely affect the driveability of the vehicle, the air/fuel ratio can be controlled more accurately.

The intake air flow rate may be controlled by varying the exhaust gas recirculation rate, throttling the intake air flow, throttling the exhaust gas flow from the engine and/or varying the valve timing of the engine or by any combination of two or more of such control methods. Preferably the intake air flow rate is controlled by varying the rate of exhaust gas recirculation. This minimises pumping losses and the fuel economy impact of air lead control. However, it is envisaged that a throttle valve in either or both the inlet or the exhaust may be used in addition to or instead of EGR rate variation. The EGR control may be high pressure EGR or low pressure EGR.

The range of engine load where the engine can be operated under air lead mode would depend upon the EGR rates at different engine loads and thus can be determined empirically for a particular application.

Where sudden acceleration or deceleration is required, the rate of change of intake air flow rate would be insufficient to provide the required response time and hence a return to a fuel lead mode would be required wherein fuel is supplied as required to obtain the torque demand. NOx emissions would increase in such further mode, but such would only be a transient mode required to improve driveability.

BRIEF DESCRIPTION OF THE DRAWING

A method of operating a compression ignition engine according to a preferred embodiment of the present invention will now be described, by way of example only, with reference to the accompanying drawing, in which:—

DESCRIPTION OF THE PREFERRED EMBODIMENTS

Figure 1:
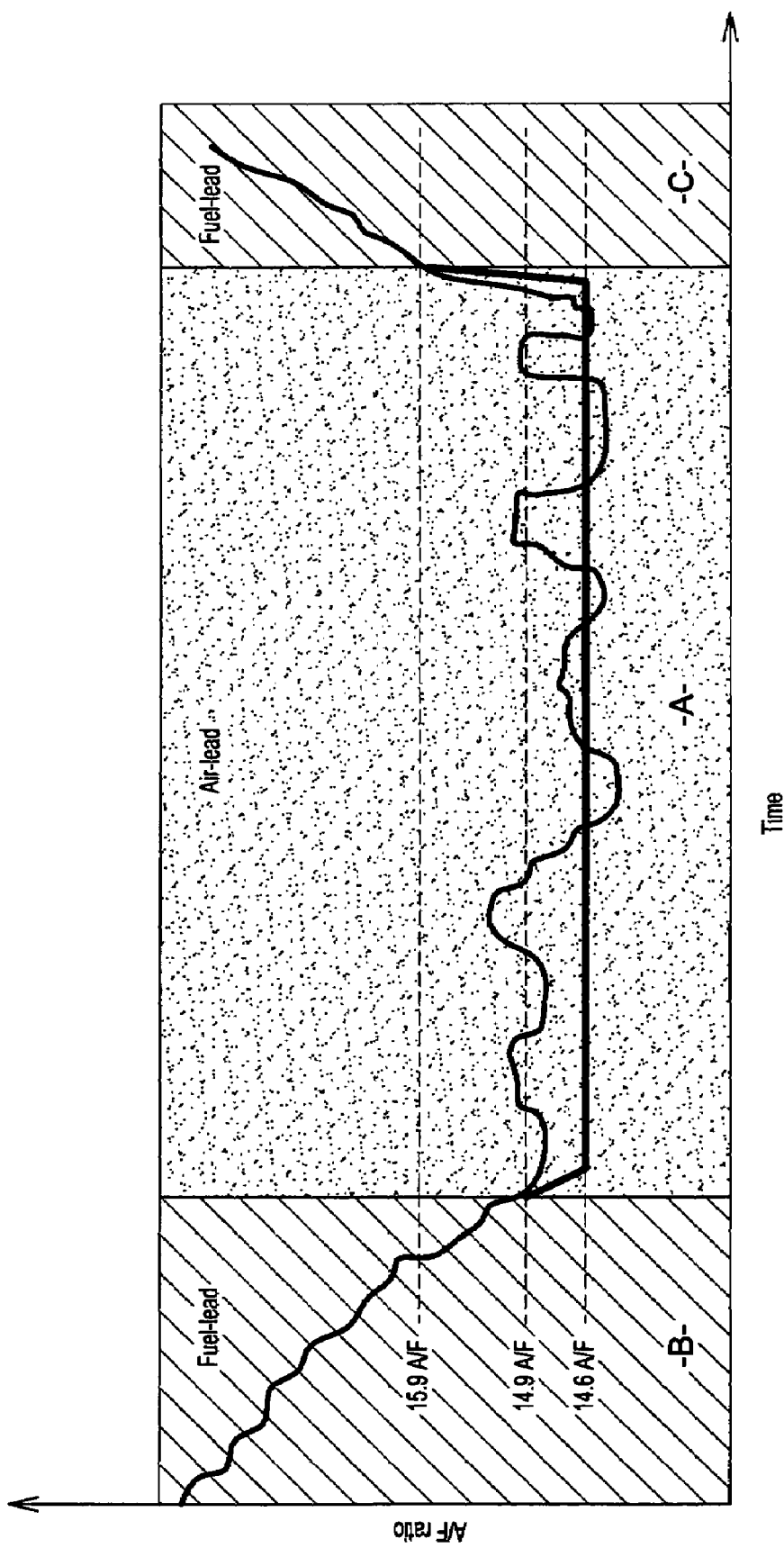
FIG. 1 shows a graph of air/fuel ratio against time for an engine operating according to an embodiment of the present invention.

A method of operating a diesel compression ignition engine in accordance with a preferred embodiment of the present invention comprises determining an instantaneous driver torque demand, selectively operating the engine in a first mode or a second mode dependent on the rate of change of driver torque demand, the first mode comprising an air lead mode whereby the intake air flow rate is controlled to achieve the instantaneous driver torque demand and an amount of fuel injected is controlled to obtain a target air/fuel ratio based upon said intake air flow rate and the second mode comprising a fuel lead mode wherein the amount of fuel injected is controlled to achieve the instantaneous torque demand, wherein the engine is operated in the first mode under substantially steady state conditions and in the second mode under conditions of rapid change of torque demand.

The use of the air lead mode during steady state operation, wherein the torque demand is served by controlling the flow rate of intake air supplied to the engine, enables much tighter control of the air/fuel ratio because the amount of fuel supplied can be controlled to achieve a target air/fuel ratio based upon the actual flow rate of air supplied to the engine, the torque demand being met by variation of the intake air flow rate rather than by variation of the amount of fuel injected, such that the fuel injection can be controlled purely to maintain the target air fuel ratio rather than to meet the torque demand as with traditional fuel lead diesel engine operation.

However, in order to provide the desired engine responsiveness during sudden changes in torque demand, the fuel lead mode is used during such sudden changes in torque demand. During the fuel lead mode, the air/fuel ratio is not tightly controlled. However, because such conditions are transient and take place over a short time period compared to the periods of steady state operation under the air lead mode, such mode changes do not significantly impact upon the overall engine emissions.

The use of EGR to control the intake air flow rate is preferred as it produces minimal flow restriction to the intake air flow and thus minimises pumping losses.

In the air lead mode operating region where it is desired to run the engine at a given air/fuel ratio (lambda), the EGR rate may be calculated by the engine management software such that there remains just enough fresh air for the engine to produce the torque requested by the driver at the desired lambda (desired fuel mass). The amount of fuel injection can then be controlled to achieve the target air/fuel ratio based upon the available air.

However, it is envisaged that other methods may be used to control the air flow rate in the engine, such as variable valve timing, throttling valves in the intake and/or the exhaust or variable pressure turbochargers or superchargers. A combination of such methods may be used to control the intake air flow rate.

The EGR process can be of the high pressure type, where the exhaust gases are removed from the exhaust upstream of the turbocharger turbine section and returned to the intake downstream of the compressor section, or of the low pressure type, wherein the exhaust gases are removed from the exhaust downstream of the particular filter (downstream of the turbine) and returned upstream of the compressor section of the turbocharger. In such lower pressure EGR systems, a throttle valve is typically provided in the exhaust downstream of the EGR take off to encourage the exhaust gases to flow into the EGR bypass passage. In such cases, the throttle valve may be controlled to further control the available air in the combustion chamber.

Since the air/EGR path (control) has a finite response time due to manifold filling effects and actuator speed limitations, the EGR rate control can not always keep-up with the fast changing demands.

In the case of a step increase or decrease of the torque demand, the fuel which needs to be injected also exhibits a corresponding step increase or decrease. In order for the lambda to stay at the same desired value, the fresh air (via variation of the EGR rate) would have to increase or decrease (i.e. by reducing or increasing the EGR rate) by the same percentage as the fuel. This is not possible because of the finite response of the air path.

To cope with this situation, the fuel-lead mode can be entered to provide improved responsiveness and derivability during sudden changes in driver torque demand, while during steady stare conditions the air lead mode is utilised to enable control the air/fuel ratio to a tight lambda target within certain boundaries.

In accordance with a preferred embodiment, the engine is operated in the air lead mode (region A of FIG. 1) where the actual air/fuel ratio achieved comes close to the target air/fuel ratio within a predetermined deadband, which can be determined by empirical calibration based on driveability and emission tolerances. In such mode, the injected fuel quantity will be adjusted to obtain exactly the target air/fuel ratio based on the measured fresh air quantity entering the engine. The calculated desired EGR rate will drive the air/fuel ratio close to the desired air/fuel ratio and in theory exactly to that target air/fuel ratio.

The engine management software calculates constantly the air/fuel ratio that would be obtained if the desired fuel (based upon the torque demand) was injected in the available air. If this calculated air/fuel ratio exceeds the target air/fuel ratio by more than said predetermined (calibratable) deadband, the air-lead mode is switched off, and the engine is operated in fuel lead mode again (areas B and C of FIG. 1). The engine operates in the fuel lead mode until the actual air/fuel ratio (which can be determined by an oxygen sensor in the exhaust) falls within the calibrated deadband of the desired air/fuel ratio whereupon the engine control can revert to air lead mode.

This structure provides the possibility of maintaining a desired or target air/fuel ratio where the dynamics of the torque changes requested by the driver do not lead to air/fuel ratio errors greater than a predetermined value.

This tight control of the air/fuel ratio of the diesel engine is required, for example, to obtain high converter efficiencies for NOx, HC and CO emissions with the use of a 3-way catalyst wherein the air/fuel ration must remain as close as possible to stoichiometric.

Various modifications and variations to the described embodiment of the invention will be apparent to those skilled in the art without departing from the scope of the invention as defined in the appended claims. Although the invention has been described in connection with a specific preferred embodiment, it should be understood that the invention as claimed should not be unduly limited to such specific embodiment.

The invention claimed is:

1. A method of operating a compression ignition engine comprising:
   determining an instantaneous driver torque demand;
   selectively operating the engine in a first mode or a second mode dependent on the rate of change of driver torque demand;
   said first mode comprising an air lead mode whereby an intake air flow rate is controlled to achieve the instantaneous driver torque demand and an amount of fuel injected is controlled to obtain a target air/fuel ratio based upon said intake air flow rate;
   said second mode comprising a fuel lead mode wherein the amount of fuel injected is controlled to achieve the instantaneous torque demand.

2. A method according to claim 1, wherein the engine is operated in the first mode under substantially steady state conditions and in the second mode under conditions of rapid change of torque demand.

3. A method according to claim 1, comprising:
   determining an instantaneous driver torque demand;
   determining an actual intake air flow rate;
   determining a required intake air flow rate to achieve the torque demand at a target air/fuel ratio;
   determining an amount of fuel to be injected to achieve said target air/fuel ratio based upon the required air intake flow rate; and
   determining an air/fuel ratio that would be achieved by injecting said determined amount of fuel into the actual intake air flow rate;
   wherein the determined air/fuel ratio falls within a predetermined range of the target air/fuel ratio, controlling the intake air flow rate to achieve said determined intake air flow rate and controlling the amount of fuel injected to achieve said target air/fuel ratio;
   and further wherein the determined air/fuel ratio falls outside of a predetermined range of the target air/fuel ratio, controlling the amount of fuel to be injected to achieve said torque demand irrespective of the target air/fuel ratio.

4. A method as claimed in claim 3, wherein, once fuel lead mode is initiated, the engine continues to be operated in fuel lead until the actual air/fuel ratio falls within said predetermined range of target air/fuel ratio, whereupon the engine is once again operated in air lead mode.

5. A method as claimed in claim 1, wherein the intake air flow rate is controlled by varying the rate of exhaust gas recirculation.

6. A method as claimed in claim 1, wherein the intake air flow rate is controlled by throttling the intake air flow.

7. A method as claimed of claim 1, wherein the intake air flow rate is controlled by throttling the exhaust gas flow from the engine.

8. A method as claimed of claim 1, wherein the intake air flow rate is controlled by varying the valve timing of the engine.

9. A method as claimed of claim 1, wherein the intake air flow rate is controlled by a combination of two or more of varying the exhaust gas recirculation rate, throttling the intake air flow, throttling the exhaust gas flow from the engine and/or varying the valve timing of the engine.

10. A method as claimed in claim 1, wherein the engine is a diesel engine.

* * * * *